US009251308B2

(12) United States Patent
Kajitani et al.

(10) Patent No.: US 9,251,308 B2
(45) Date of Patent: Feb. 2, 2016

(54) SIMULATION METHOD, SYSTEM, AND PROGRAM

(75) Inventors: Kohichi Kajitani, Kanagawa (JP); Hideaki Komatsu, Kanagawa (JP); Shu Shimizu, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 13/555,731

(22) Filed: Jul. 23, 2012

(65) Prior Publication Data

US 2014/0025365 A1    Jan. 23, 2014

(51) Int. Cl.
*G06F 17/50* (2006.01)
*B60T 8/40* (2006.01)
*G06F 11/36* (2006.01)

(52) U.S. Cl.
CPC ........... *G06F 17/5095* (2013.01); *B60T 8/4081* (2013.01); *G06F 17/5009* (2013.01); *G06F 11/3632* (2013.01); *G06F 2217/86* (2013.01)

(58) Field of Classification Search
None
See application file for complete search history.

(56) References Cited

U.S. PATENT DOCUMENTS

| 5,522,029 | A |   | 5/1996 | Hatfield |
| 5,911,059 | A | * | 6/1999 | Profit, Jr. ......................... 703/23 |
| 6,108,494 | A | * | 8/2000 | Eisenhofer et al. ............. 703/14 |
| 7,178,112 | B1 | * | 2/2007 | Ciolfi .................... G06F 17/504 703/2 |
| 7,366,650 | B2 | * | 4/2008 | Nightingale et al. ........... 703/26 |
| 7,676,265 | B1 | * | 3/2010 | Paris et al. ...................... 607/18 |
| 8,265,917 | B1 | * | 9/2012 | Ou et al. .......................... 703/14 |
| 8,498,856 | B2 | * | 7/2013 | Kataoka .............. G06F 17/5009 703/1 |
| 8,670,967 | B2 | * | 3/2014 | Komatsu ............... G05B 17/02 703/13 |
| 2002/0120909 | A1 | * | 8/2002 | Brouhard et al. ................. 716/5 |
| 2002/0133325 | A1 | * | 9/2002 | Hoare et al. .................... 703/17 |
| 2007/0261038 | A1 | * | 11/2007 | Suba ........................ G06F 8/51 717/136 |
| 2008/0052049 | A1 | * | 2/2008 | Moriyama .......... G06F 17/5009 703/2 |

(Continued)

FOREIGN PATENT DOCUMENTS

| EP | 1 452 968 A1 | 9/2004 |
| JP | 10312315 A | 11/1998 |
| JP | 2004013626 A | 1/2004 |
| JP | 2007011720 A | 1/2007 |
| WO | WO 2011046089 A1 | 4/2011 |

OTHER PUBLICATIONS

Search Report from WO 2011046089 A1.

(Continued)

*Primary Examiner* — Kibrom K Gebresilassie
(74) *Attorney, Agent, or Firm* — Scully, Scott, Murphy & Presser, P.C.; Gail H. Zarick, Esq.

(57) ABSTRACT

System and method for achieving reproducibility of a simulation operation while reasonably keeping an operation speed. A peripheral scheduler clears completion flags of all the peripheral emulators to thereby start parallel operations thereof. Then, based on processing break timing set for the individual peripheral emulators, the peripheral scheduler finds one of the peripheral emulators which is scheduled to reach a processing break at the earliest. The found peripheral emulator is referred to as a peripheral P. In a case where a time of the processing break of the peripheral P is T, the peripheral scheduler continues execution of processor emulators and plant simulators up until a time point of the time T. The peripheral scheduler waits for setting of a completion flag of the peripheral P. In response to the setting, the peripheral scheduler performs data synchronization among the peripheral P, the processor emulators, and the plant simulators.

18 Claims, 12 Drawing Sheets

(56) References Cited

U.S. PATENT DOCUMENTS

| | | | |
|---|---|---|---|
| 2009/0281779 A1* | 11/2009 | Kajitani et al. ................... 703/7 | |
| 2009/0306952 A1* | 12/2009 | Kajitani .............. G06F 17/5022 703/13 | |
| 2010/0293342 A1* | 11/2010 | Morfey ............... G06F 9/30032 711/154 | |
| 2011/0015916 A1* | 1/2011 | Kataoka .............. G06F 17/5095 703/19 | |
| 2012/0029893 A1* | 2/2012 | Komatsu ................ G05B 17/02 703/8 | |
| 2013/0151220 A1* | 6/2013 | Matsumura ......... G06F 17/5009 703/7 | |

OTHER PUBLICATIONS

Harrath et al., "Timed SystemC Waiting-State Automata", Third International Workshop on Verification and Evaluation of Computer and Communication Systems, (VECoS 2009), Rabat, Morroco, Jul. 2-3, 2009, pp. 1-13.

Computer multitasking, Wikipedia, http://en.wilipedia.org/wiki/Multitasking, last updated Sep. 6, 2013, pp. 1-5.

Multiprocessing, Wikipedia, http://en.wilipedia.org/wiki/Multiprocessing, last updated Sep. 6, 2013.

Multithreading (computer architecture), Wikipedia, http://en.wilipedia.org/wiki/Multithreading_(computer_architecture), last updated Sep. 6, 2013.

SystemC, Wikipedia, http://en.wilipedia.org/wiki/SystemC, last updated Sep. 6, 2013, pp. 1-6.

Event-driven programming, Wikipedia, http://en.wilipedia.org/wiki/Event-driven_progamming, last updated Sep. 6, 2013, pp. 1-4.

Event-driven process chain, Wikipedia, http://en.wilipedia.org/wiki/Event-driven_process_chain, last updated Sep. 6, 2013, pp. 1-5.

* cited by examiner

SIMULATION METHOD, SYSTEM, AND PROGRAM

TECHNICAL FIELD

The present invention relates to simulation of a physical system of an automobile or the like, and more particularly relates to a software-based simulation system.

BACKGROUND ART

In the early 20th century which is an early stage of development of an automobile, an automobile has been constituted of mechanical parts including an engine supplying motive power, a brake, an accelerator, a steering wheel, a transmission, and a suspension, but has used almost no electrical mechanism except an ignition plug in an engine and a headlight.

However, there has arisen a need for efficiently controlling the engine in case of air pollution, oil crisis, and the like since around 1970s. Thus, an ECU has been started to be used for controlling the engine. The ECU generally includes: an input interface configured to perform, for example, A/D conversion on an input signal from a sensor; a logical computing unit (a microcomputer) configured to process a digital input signal according a predetermined logic; and an output interface configured to convert a result of the processing by the logical computing unit into a signal for starting an actuator.

Nowadays, in addition to the mechanical parts, electronics parts and software account for a significant percentage in a recent automobile, even in not only control systems for the engine, the transmission, and the like, an Anti-lock Braking System (ABS), an Electronic Stability Control (ESC), a power steering but also a windshield wiper control, a security monitoring system, and the like. It is said that development cost of the electronics parts and the software accounts for 25% or 40% in the total development cost. For a hybrid automobile, the development cost accounts for 70%.

Meanwhile, an automobile includes mechanical parts (plants) including a motive power apparatus such as an engine, a power transmission apparatus, a traveling apparatus such as a steering, a brake apparatus, a body system, and the like. Operations of the plants are dynamically determined by programs of 30 to 70 or more electronic control units (ECUs) in response to input from sensors (for speed and the like) and input from a driver (through an accelerator or the like).

Each ECU basically controls the operation of a single plant. For example, software of an engine control unit determines an amount and timing of fuel injection to the engine as well as ignition. From its nature, the software can also increase or decrease the fuel injection amount according to mode in such a luxury automobile that is provided with "sport" mode. The software can also tune the engine revolutions to down-shift timing by automatically performing blipping. In this case, the ECU of the engine and the ECU of the transmission need to operate in cooperation with each other. An integrated vehicle-posture Electronic Stability Control (ESC) system for preventing skids and the like of an automobile further requires cooperation with a braking apparatus such as a brake, and thus ECU software for the system becomes more complicated. Incidentally, from the nature of the software, such an "intervention" function can be eliminated easily.

Meanwhile, in order to fully utilize the performance of the plant and to operate the plant safely, it is important to thoroughly perform operational parameter tuning and tests in a design and development process of the ECU software. Generally, it costs too much and takes a too long time to repeat the tuning and the tests after prototyping of an actual automobile. Thus, a method is strongly desired in which a controller and plants are virtually implemented by a computer before prototyping and are operated at a high speed and accurately for checking their operations. Such ECU simulation is performed by the following four methods: (1) Model-in-the-loop Simulation (MILS) that logically represents an operation of a controller by using such a form as a state machine; (2) Software-in-the loop Simulation (SILS) that introduces some hardware restrictions such as data accuracy to the logic operation of the controller; (3) Virtual Processor-in-the-loop Simulation (V-PILS) that emulates an ECU processor with software fully implemented; and (4) Hardware-in-the-loop Simulation (HILS) in which an ECU board is completely mounted to be connected to a real-time plant simulation. The simulations become closer to a prototype in this order.

MILS and SILS are mainly used in a trial and error phase for obtaining a basic performance of each plant. However, MILS and SILS operate in a different manner from software actually to be provided to the ECU, and thus cannot be used for verifying a product. In contrast, V-PILS uses completed ECU software, and thus is very promising as a method for detecting and solving an undesirable operation (bug) of the software. However, there has been no case where a reproducible operation is achieved. HILS is always implemented for final operation check of the completed ECU board. However, even if a failure is detected, reproducibility of the failure is not guaranteed. Thus, HILS cannot be used for debugging.

The reason why an operation cannot be reproduced in HILS is not that configuration of HILS is not perfect but that ECUs are connected to each other through a network such as a CAN. Generally, a network achieves loose coupling of modules, and thus a slight timing difference among operations of the modules causes the order of data arrival to be changed. As the result, a behavior of the system might vary on the whole. Thus, even if a prototype of an actual automobile is produced, an operation thereof is not expected to be reproduced. The reason is the same as the reason why debugging of a parallel and distributed system is very difficult.

As described above, simply using the HILS configuration, that is, simply using the configuration having the loose coupling of the ECU board and the plant simulators does not achieve operational consistency, even though the components are made operate at a high speed. Achieving consistency of the order of communications is required to achieve the reproducibility of the operations. V-PILS is particularly expected to solve this problem.

FIG. 1 shows a typical V-PILS configuration according to a conventional concept. The configuration includes multiple ECU emulators, multiple plant simulators, and a global scheduler 110 configured to schedule overall operations. It should be understood that FIG. 1 illustrates two ECU emulators 102, 104 and two plant simulators 106, 108 for convenience, but more ECU emulators and plant simulators than illustrated are actually provided.

The ECU emulator 102 includes a processor emulator 102a and a peripheral emulator 102b. Since the ECU emulator 104 has the same configuration, a detailed description of the ECU emulator 104 is omitted.

As for the plant simulator 106, a clock converter 106a is connected thereto. Since the plant simulator 108 has the same configuration, a detailed description of the plant simulator 108 is omitted. For example, the plant simulator 106 is a brake simulator, and the plant simulator 108 is an engine simulator.

Meanwhile, frequencies in FIG. 1 are exemplary typical operating clock speeds. That is, the processor emulator 102a operates at a relatively high clock speed of 80 MHz. In contrast, the plant simulator 106 is a simulator for a physical mechanism, and thus operates at a relatively low speed of 10 KHz.

Next, an operation in the configuration in FIG. 1 will be described by referring to a timing diagram in FIG. 2. Each plant simulator that performs simulation in a fixed-step clock repeats input and output, for example, at 10 KHz, that is, in a time step of 100 μs. The input to the plant simulator is mainly an instruction signal from the controller and the output from the plant simulator is sent to a sensor.

Each peripheral emulator is equivalent to an I/O interface part of the ECU emulator and connects the plant simulator and the processor emulator. The peripheral emulator can be considered to typically (averagely) operate at a resolution of approximately 10 MHz. This speed is higher than that of the plant simulator but lower than that of the processor emulator. The peripheral emulator transmits a pulse signal to the plant simulator.

Each clock converter is arranged between the peripheral emulator and the plant simulator. The clock converter has a function of decreasing the frequency of a clock signal from the peripheral emulator to match the plant simulator and of gradually increasing a frequency of a signal from the plant simulator to match the peripheral emulator.

Each peripheral emulator transmits or receives data to or from the processor emulator in response to a read/write (R/W) request and transmits an interrupt (INT) to the processor emulator. In particular, a function of a network such as the CAN (controller area network) for mutually connecting the processors requires communications among peripherals.

Many of embedded processors operate at approximately 80 to 100 MHz, and thus the time resolution thereof is approximately 10 times higher than that of the peripherals. Each processor performs read and write operations on data from and to a corresponding one of the peripherals and receives an interrupt signal (INT) from the peripheral.

When viewed from one aspect, the peripheral is the center of a system, connecting the plant and the processor with each other, and the processors with each other. The processor performs the R/W operations at the higher time resolution than that of the peripheral. However, when being transmitted to the plant or another processor, a signal for any of the operations is under control of the time resolution of the peripheral. Accordingly, if synchronization processing is performed on sensor data or the like at the time resolution of the peripheral in the simulation system on the whole, the order or processing of I/O data and interrupts is correctly reproduced (minimum synchronization).

Generally, making time intervals of the synchronization shorter can achieve more correct operations. However, this increases overhead of the processing time, and thus increases the total processing time. The minimum synchronization provides an upper limit of the time resolution which does not require any shorter interval.

One of solutions is making the time intervals of synchronization longer up to a greatest common divisor in accordance with the global scheduler 110, as shown in FIG. 3. This can achieve correctness. However, this increases synchronization processing performed at unnecessary timing, and thus increases the overhead of the synchronization processing very much. Thereby, the processing rate of the simulation system is considerably decreased.

If breaks of the processing of the peripheral cannot be explicitly utilized, even the greatest common divisor is difficult to know. Thus, taking a solution of increasing the time resolution further increases the overhead.

In contrast, if the time resolution is made lower, many I/O data pieces and interrupts are included in the same time step. Thus, information on temporal relationship thereamong is lost. This is a state in which simulation is not executed properly, that is, in which the correctness is not achieved. In particular, the order of executing the interrupt processing is very important to operate the software as intended. The few existing V-PILS systems undergo the incorrect simulation state and have a serious problem that the ECU software is not satisfactorily debugged due to the loss of the order information.

Japanese Patent Application Publication No. 2007-11720 has a problem to be solved that a structure of a system simulator is to be changed flexibly while a complicated structure of a system is supported. Japanese Patent Application Publication No. 2007-11720 discloses that a system simulator includes three types of simulators of instruction setting simulators each simulating an operation of a CPU, bus simulators each simulating an operation of a bus, and peripheral simulators each simulating an operation of a peripheral, and is provided with interfaces by which the simulators of each type can refer to and change conditions of the simulators of the other types. However, this conventional technique does not suggest a technique of optimizing synchronization between the peripherals and the CPUs.

PRIOR ART DOCUMENT

Patent Document

PATENT DOCUMENT 1: Japanese Patent Application Publication No. 2007-11720

SUMMARY OF THE INVENTION

Problems to be Solved by the Invention

An object of the present invention is to provide V-PILS making it possible to achieve reproducibility of a simulation operation while reasonably keeping an operation speed.

Means for Solving the Problems

The invention has been made to solve the above problems. According to the invention, there are prepared peripheral emulators, processor emulators, and a peripheral scheduler configured to control operation timing of entire plant simulators.

According to the invention, in order to enable control by the peripheral scheduler, there are also prepared completion flags to which each peripheral emulator, each processor emulator, and each plant simulator correspond, respectively.

Each peripheral emulator has processing breaks specific to the peripheral emulator. Typically, the peripheral emulator is described in SystemC. Thus, by scanning source code thereof by a program, each of the specific processing breaks can be located. Typically, a line describing wait( ) corresponds to the break.

The thus located information on processing breaks of the peripheral emulators is associated with the peripheral scheduler.

After the preparations described above, the peripheral scheduler clears (sets to OFF) the completion flags of all the peripheral emulators to thereby start parallel operations. Then, based on the information on the processing breaks of the individual peripheral emulators, the peripheral scheduler finds one of the peripheral emulators which is scheduled to reach a processing break at the earliest. The found peripheral emulator is referred to as a peripheral P. In a case where a time of the processing break of the peripheral P is T, the peripheral scheduler continues execution of the processor emulators and the plant simulators up until a time point of the time T.

The peripheral scheduler waits for setting of a completion flag of the peripheral P. When reaching the processing break, the peripheral P sets the completion flag to ON. In response to the setting of the completion flag of the peripheral P, the peripheral scheduler performs data synchronization among the peripheral P, the processor emulators, and the plant simulators.

Then, the peripheral scheduler clears (sets to OFF) the completion flag of the peripheral P to resume the operation of the peripheral P. Thereby, all the peripheral emulators again operate in parallel.

Thereafter, based on the information on the processing breaks set for the individual peripheral emulators, the peripheral scheduler finds one of the peripheral emulators which is scheduled to subsequently reach a processing break at the earliest. The peripheral scheduler operates the entire simulation system according to operation scheduling based on such processing break timing of the peripheral emulators.

Effects of the Invention

As described above, the present invention provides an advantageous effect that in the simulation system in which the individual modules communicate with one another via the peripherals, processing reproducibility is guaranteed by operation scheduling based on processing break timing of the peripheral emulators. In addition, the processing is synchronized at an optimum granularity which is lower than the granularity of minimum synchronization and at which processing reproducibility can be guaranteed, that is, based on information on the processing breaks of the peripheral emulators. Thus, optimization of the simulation is achieved.

MODES FOR CARRYING OUT THE INVENTION

Figure 1:
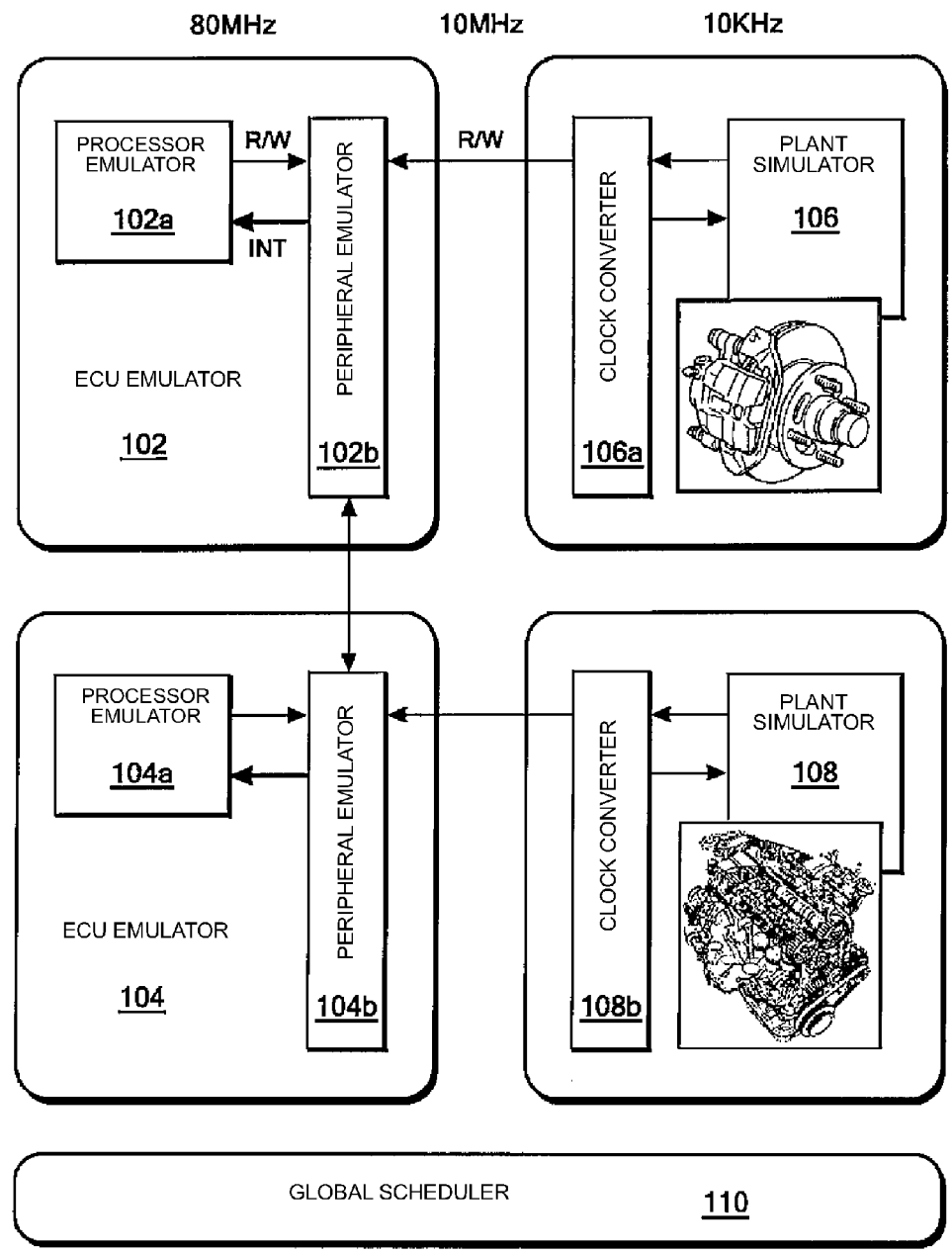
FIG. 1 is a block diagram showing a configuration of a conventional V-PILS.
Figure 2:
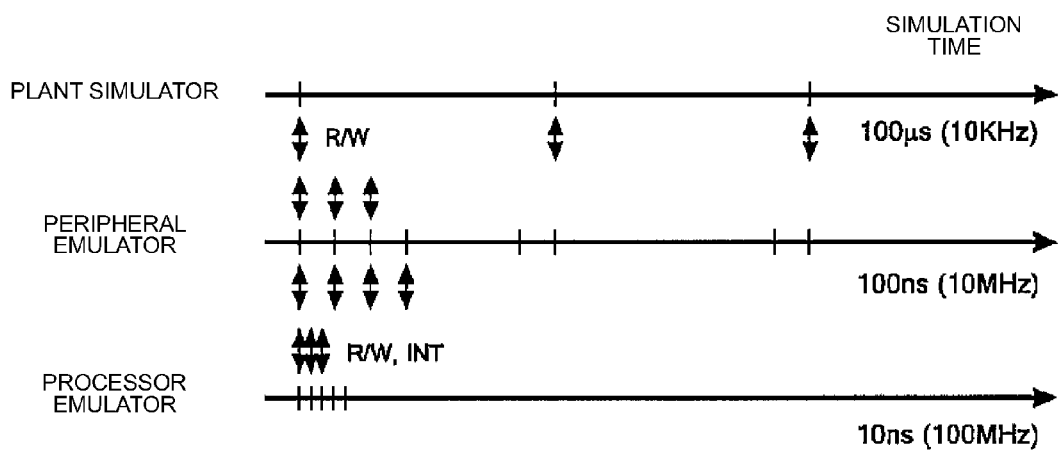
FIG. 2 is a timing diagram showing an operation of the conventional V-PILS.
Figure 3:
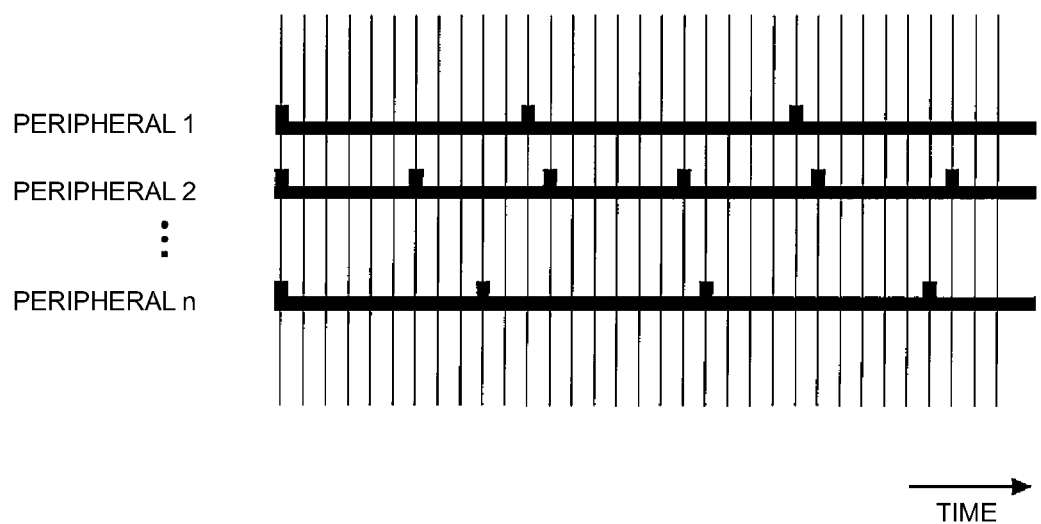
FIG. 3 is a timing diagram showing an operation of the conventional V-PILS performing synchronization at the lowest granularity.

A configuration and processing in an embodiment of the present invention will be described below by referring to the drawings. In the following description, the same components are denoted by the same reference numerals throughout the drawings unless otherwise noted. In addition, the following configuration and the processing are described merely as an embodiment. Thus, it is to be understood that the technical scope of the present invention is not intended to be limited to this embodiment.

Figure 4:
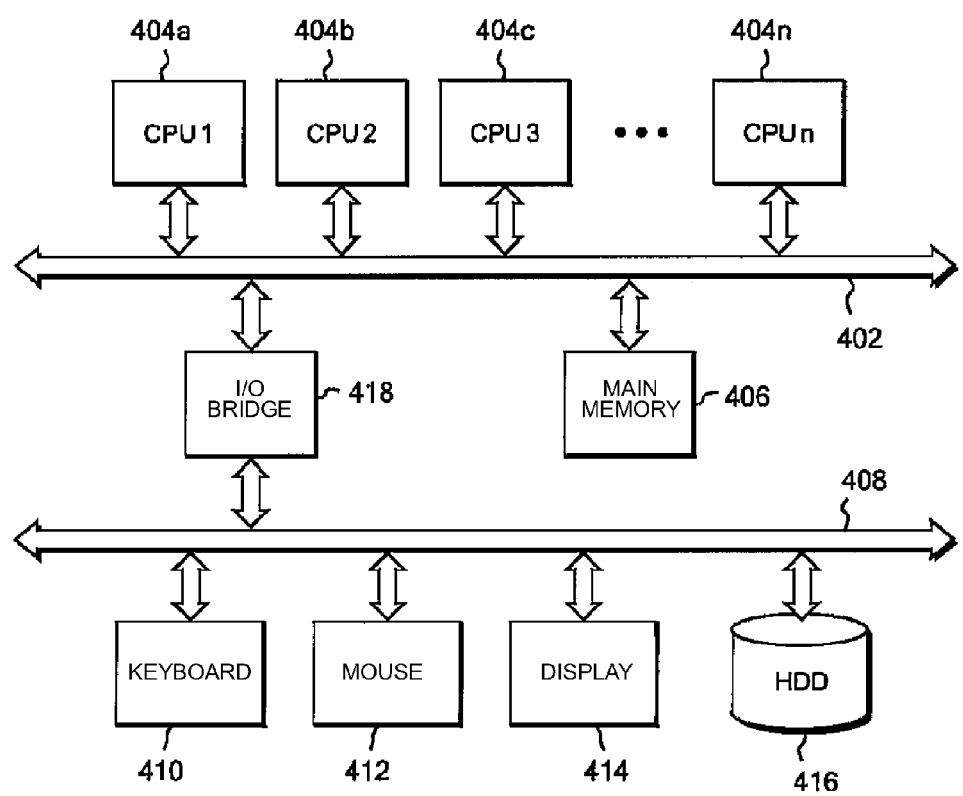
FIG. 4 is a block diagram of a computer hardware configuration.

First of all, computer hardware used for implementing the present invention will be described by referring to FIG. 4. In FIG. 4, multiple CPUs, CPU1 404a, CPU2 404b, CPU3 404c, . . . and CPUn 404n are connected to a host bus 402. To the host bus 402, a main memory 406 for computing of the CPU1 404a, the CPU2 404b, the CPU3 404c, . . . and the CPUn 404n is further connected.

Meanwhile, to an I/O bus 408, a keyboard 410, a mouse 412, a display 414 and a hard disk drive 416 are connected. The I/O bus 408 is connected to the host bus 402 through an I/O bridge 418. The keyboard 410 and the mouse 412 are used by the operator for operations, for example, the operator inputs a command by using the keyboard 410, or clicks on a menu by using the mouse 412. The display 414 is used to display a menu for processing operation through a GUI, when necessary.

IBM® System X is preferable computer system hardware to be used for the purpose of implementing the present invention. When IBM® System X is used, the CPU1 404a, the CPU2 404b, the CPU3 404c, . . . and the CPUn 404n are each Intel® Xeon®, for example, and the operating system is Windows (trademark) Server 2003. The operating system preferably has a multitask function. The operating system is stored in the hard disk drive 416, and is loaded into the main memory 406 from the hard disk drive 416 at the time of starting the computer system.

It is desirable to use a multiprocessor system in order to implement the present invention. The multiprocessor system is generally intended to be a system using a processor having multiple cores each functioning as a processor which can perform computing independently. Thus, it should be understood that any of a multi-core single-processor system, a single-core multiprocessor system, and a multi-core multiprocessor system may be used.

Here, the computer system hardware which can be used for implementing the present invention is not limited to IBM® System X, and any computer system as long as being capable of running a simulation program of the present invention can be used. In addition, the operating system is not limited to Windows®, and any operation system such as Linux® or Mac OS® can be used. Moreover, in order to execute the simulation program at a high speed, a computer system such as IBM® System P using AIX (trademark), as the operating system, based on POWER (trademark) 6 may be used.

The hard disk drive 416 further stores programs such as processor emulators, a peripheral scheduler, peripheral emulators, clock converters, and plant simulators, which will be described later. These are loaded into the main memory, assigned to the individual CPUs CPU1 to CPUn as individual threads or processes, and thereby executed. Thus, the computer system shown in FIG. 4 preferably includes a sufficient number of CPUs to which the individual threads of the processor emulators, the peripheral scheduler, the peripheral emulators, the clock converters, and the plant simulators can be assigned.

Figure 5:
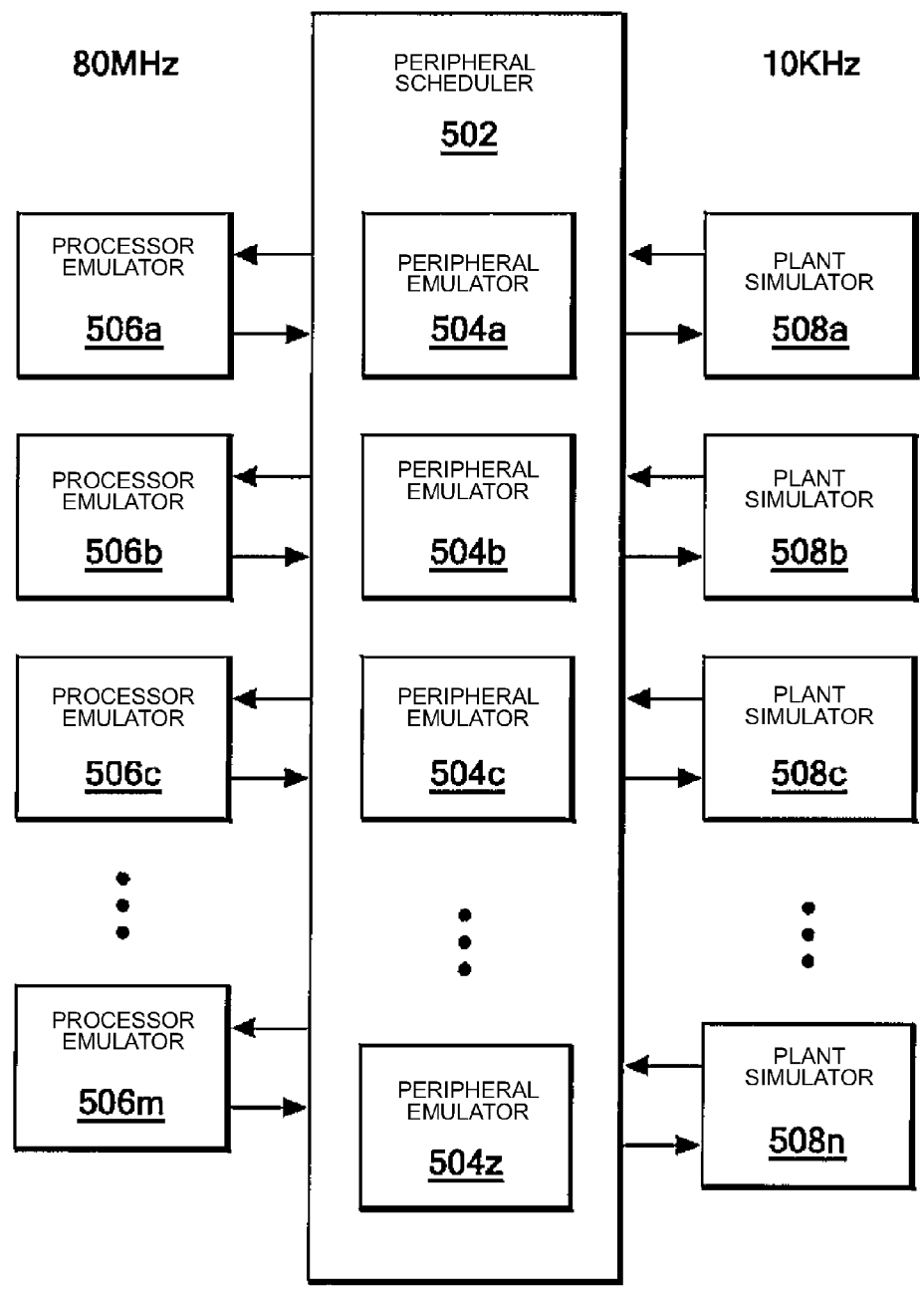
FIG. 5 is a block diagram showing a logical connection relationship among a peripheral scheduler, peripheral emulators, processor emulators, and plant simulators.

FIG. 5 is a functional block diagram showing a cooperation relationship among the processor emulators, the peripheral scheduler, the peripheral emulators, the clock converters, and the plant simulators which are assigned to the individual CPUs CPU1 to CPUn and operate as individual threads or processes.

As shown in FIG. 5, the present invention is characterized in that a peripheral scheduler 502 which itself is a thread or a process closely controls peripheral emulators 504a, 504b, 504c, ..., and 504z which are threads or processes independent from the peripheral scheduler 502. Further better understanding of the feature will be obtained by making a comparison with the typical conventional configuration in FIG. 1 in which the peripheral emulator is included in each ECU emulator and operates independently from each other.

In FIG. 5, basically, processor emulators 506a, 506b, 506c, ..., and 506m which are independent threads or processes each receive an interrupt signal from a corresponding one of the peripheral emulators 504a, 504b, 504c ..., and 504z and operate while communicating therewith, but are also controlled by the peripheral scheduler 502 directly. The mechanism of the control will be described later.

In contrast, plant simulators 508a, 508b, 508c, ..., and 508n which are independent threads or processes communicate with the peripheral emulators 504a, 504b, 504c, ..., and 504z. The plant simulators 508a, 508b, 508c, ..., and 508n respectively include therein modules which serve as the clock converters shown in FIG. 1, although the modules are not illustrated in FIG. 5. Generally, the number of operating clocks of a peripheral emulator is approximately 1000 times larger than the number of operating clocks of a plant simulator. Thus, interface tuning needs to be performed by thinning out incoming pulses to the plant simulator from the peripheral emulator and by increasing pulses transmitted from the plant simulator to the peripheral emulator. This is achieved by providing such a clock converter function.

Figure 6:
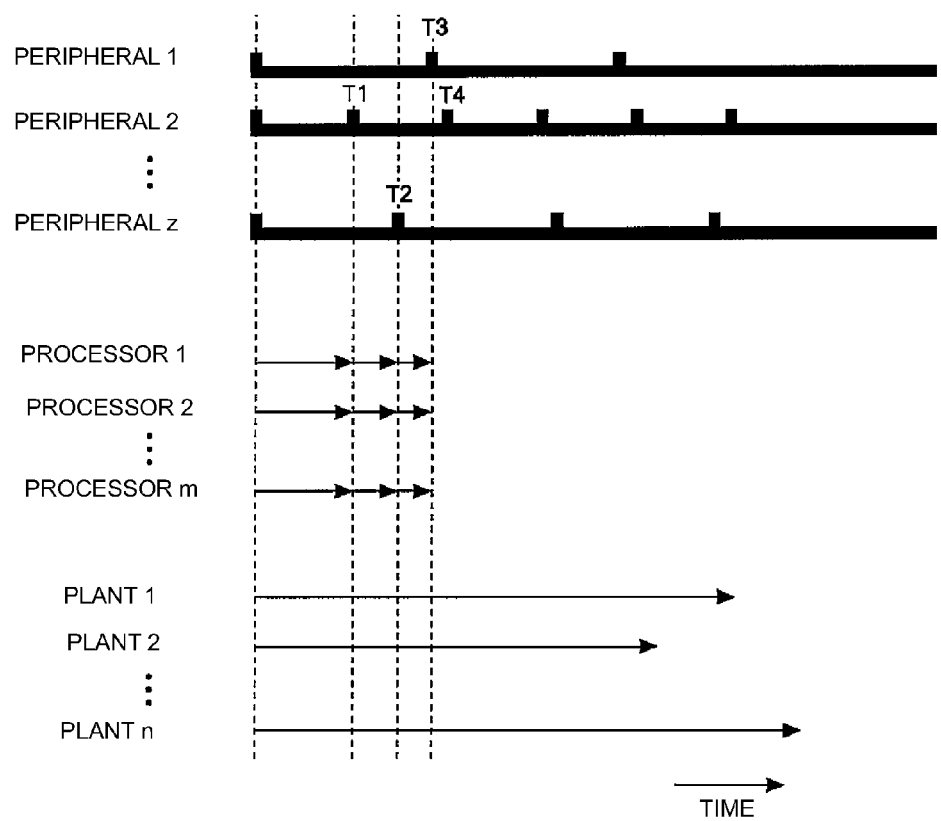
FIG. 6 is a timing diagram showing an operation in a configuration of a simulation system of the present invention.

FIG. 6 is a timing diagram showing an overview of operations of peripheral emulators, processor emulators, and plant simulators under control of the peripheral scheduler.

Each of the peripheral emulators has time information corresponding to specific processing break positions. To acquire a value of the information, for example, source code in SystemC for describing the peripheral emulator is parsed by a computer program. Each of the break positions of the peripheral emulator corresponds to a line describing wait( ) in a case of description in SystemC.

The thus acquired time information corresponding to the processing break position of the peripheral emulator is associated with the peripheral scheduler 502 in advance. The peripheral scheduler 502 uses the time value of the processing break position to define break timing of processing of the peripheral emulator which is closest to an arbitrary time point. Then, the peripheral scheduler 502 executes all the processor emulators and all the plant simulators aiming at the determined timing for synchronization thereof.

At this time, if the processing break position of the peripheral emulator is observed cyclically, the peripheral scheduler 502 can calculate timing the next processing break by multiplying a value of the cycle stored for each peripheral emulator by an integer, the value of the cycle being stored for each peripheral emulator in advance. However, generally, the processing break position of the peripheral emulator is not observed cyclically, except in very limited cases.

Hence, the peripheral scheduler 502 performs processing of selecting a peripheral emulator as a synchronization source in the following manner. Specifically, for example, a predetermined program scans source code in SystemC of the peripheral emulators, and thereby stores a table including peripheral-emulator-based processing break times in a shared memory or the like. This table is designed to allow the peripheral scheduler 502 to refer to the table. This makes it possible for the peripheral scheduler 502 to calculate the next processing break by using addition based on entries of the table, and to select, as the next target time, a processing break closest to the time of currently performed simulation.

In an example shown in FIG. 6, the peripheral scheduler 502 recognizes timing $T_1$ associated with a peripheral 2 as a first processing break timing of a peripheral emulator after a simulation system is started. Then, the peripheral scheduler 502 executes all the processor emulators and all the plant simulators aiming at the timing $T_1$.

Next, the peripheral scheduler 502 recognizes timing $T_2$ associated with a peripheral n as a next processing break timing of a peripheral emulator after the simulation system is started. Then, the peripheral scheduler 502 executes all the processor emulators and all the plant simulators aiming at the timing $T_2$.

The peripheral scheduler 502 defines processing break timing of the peripheral emulator serially as described above by finding in turn timing of any peripheral emulator closest to the time of currently performed simulation. The finding is performed based on time information of the processing break positions of all the peripheral emulators stored in the peripheral scheduler 502 in advance, being started from the start time point of the simulation system.

Figure 7:
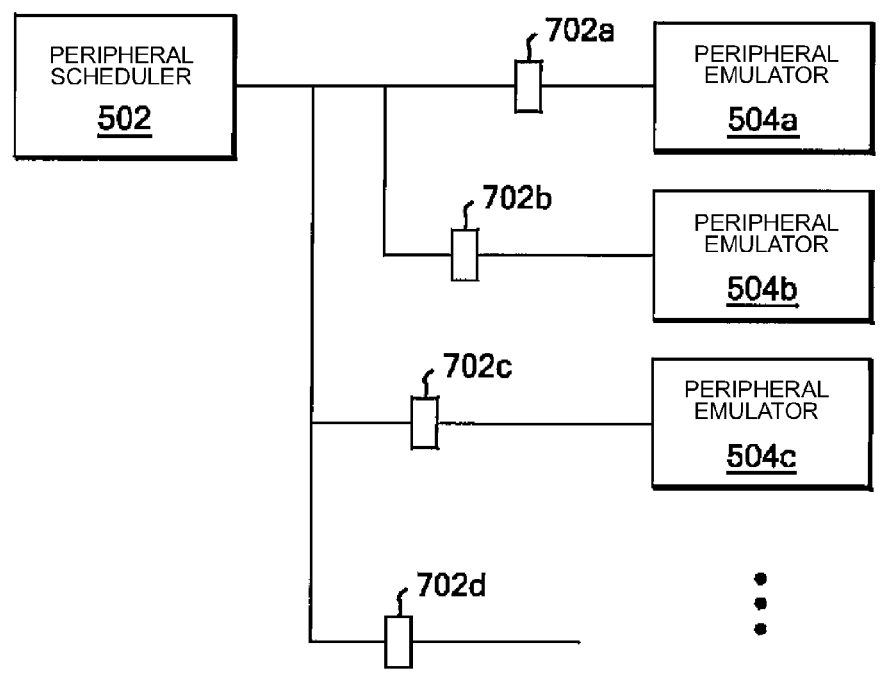
FIG. 7 is a diagram showing functions of completion flags for the peripheral emulators.

FIG. 7 is a diagram schematically showing a mechanism of synchronization control performed by the peripheral scheduler 502. Specifically, according to this embodiment of the invention, completion flags 702a, 702b, 702c, and ... corresponding to the peripheral emulators 502a, 502b, 502c, and ..., respectively, are provided in a predetermined region of the main memory 406. The peripheral scheduler 502 executes synchronization control over the peripheral emulators 502a, 502b, 502c, and ... by using such completion flags 702a, 702b, 702c, and ....

Figure 8:
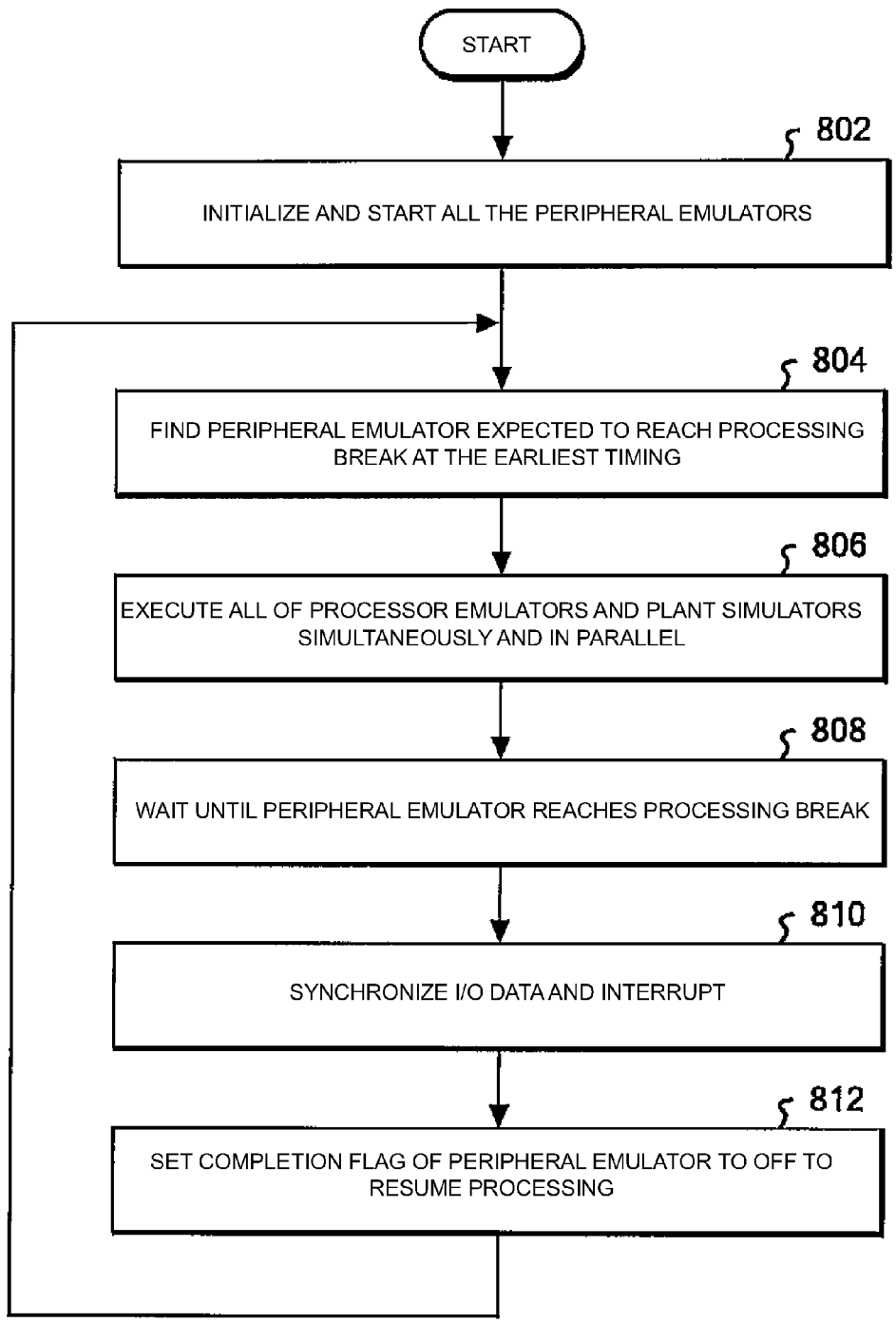
FIG. 8 is a flowchart of an operation of the peripheral scheduler.

Next, processing of the peripheral scheduler 502 will be described by referring to a flowchart in FIG. 8. In FIG. 8, the peripheral scheduler 502 initializes and then causes all the peripheral emulators to start processing in Step 802. The initialization includes resetting the completion flags 702a, 702b, 702c, and ... corresponding to the peripheral emulators 502a, 502b, 502c, and all to OFF.

In Step 804, as described above, the peripheral scheduler 502 refers to the table including the peripheral-emulator-based processing break times and thereby finds any of the peripheral emulators which is expected to reach a processing break at the earliest.

In Step 806, the peripheral scheduler 502 executes all the processor emulators and all the plant simulators simultaneously and in parallel aiming at a time point shown by the found earliest timing in Step 804. Then, the peripheral scheduler 502 waits for completion of the processing.

In Step 808, the peripheral scheduler 502 waits until the peripheral emulator associated with the timing found in Step 804 reaches the processing break.

When the peripheral emulator having the timing found in Step 804 as the processing break reaches the processing break, the peripheral emulator sets a completion flag thereof to ON to stop the processing once. The processing will be described in detail later by referring to a flowchart in FIG. 9. The peripheral scheduler 502 is notified of the reaching through inter-thread communication. In Step 810, the peripheral scheduler 502 synchronizes I/O data synchronization and an interrupt between the peripheral emulators and the processor emulators and between the peripheral emulators and the plant simulators. Upon completion of the synchronization, the peripheral scheduler 502 sets the completion flag, to OFF, of the peripheral emulator associated with the timing found in Step 804 and then returns to Step 804.

In Step 804, the peripheral scheduler 502 finds any of the peripheral emulators which is expected to subsequently reach a processing break at the earliest. The peripheral emulator which is expected to subsequently complete processing at the earliest is the peripheral n in the example in FIG. 6. In relation to this, timing $T_2$ is selected.

Figure 9:
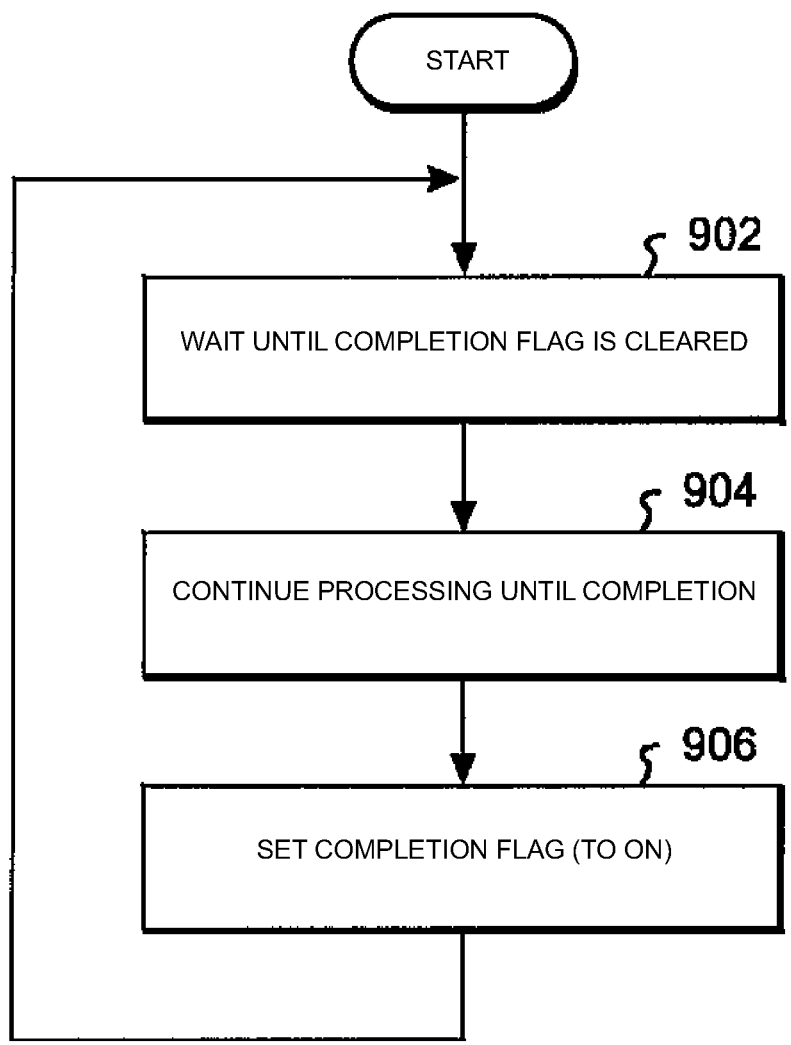
FIG. 9 is a flowchart of an operation of each peripheral emulator.

Next, an operation of each peripheral emulator will be described by referring to the flowchart in FIG. 9. This operation assumes that a completion flag is ON in the initial state. Hence, in Step 902, the peripheral emulator waits for clearing (OFF) of the completion flag.

When the peripheral scheduler 502 clears the completion flag, the peripheral emulator proceeds to Step 904 to perform processing specific to the peripheral emulator. Upon completion of the processing, the peripheral emulator sets the completion flag (to ON), and returns to Step 902 to wait for the clearing (OFF) of the completion flag.

Next, a description is given of control over processor emulators by the peripheral scheduler 502. In the simulation system in this embodiment, processors of a host, that is, the CUP 1, CPU2, . . . , and the CPU n shown in FIG. 4 execute programs developed for processors for a guest, that is, an actual system such as an embedded system of an automobile. At this time, regardless of whether source code is present or only binary code for the guides is present, the code is executed after being converted into binary code to be used by the host processors.

However, according to the present invention, when the code is converted, special code is inserted into the binary code at necessary points for synchronization with the peripheral scheduler 502.

Firstly, code for updating and then incrementing data (T_CPU) indicating a processor time is inserted at the beginning of a basic block or end of a loop in the code under conversion. In other words, a certain constant Const is added to T_CPU as described below. The constant is predetermined based on a time parsing of the guest code.

$$T\_CPU\mathrel{+}=Const$$

In addition, the following code for determining the necessity of waiting is inserted into the code to be executed by the host processor, the determination being made by comparing a time to stop the simulation with the progress time of a corresponding one of the host processors every 80 cycles.

```
if (T_CPU > T_Peripheral) {
  POST Completion_flag;
  do {SLEEP_TEMPORARY;} while (T_CPU > T_Peripheral);
}
```

Note that POST Completion_flag is processing of setting the completion flag (Completion_flag) (to ON). A region for a completion flag is preferably reserved in the shared memory. A loop of while (T_CPU>T_Peripheral) performs wait operations of SLEEP TEMPORARY until T_CPU>T_Peripheral is determined to be false after the peripheral scheduler 502 or the like overwrites a value of T_Peripheral reserved in the shared memory.

Figure 10:
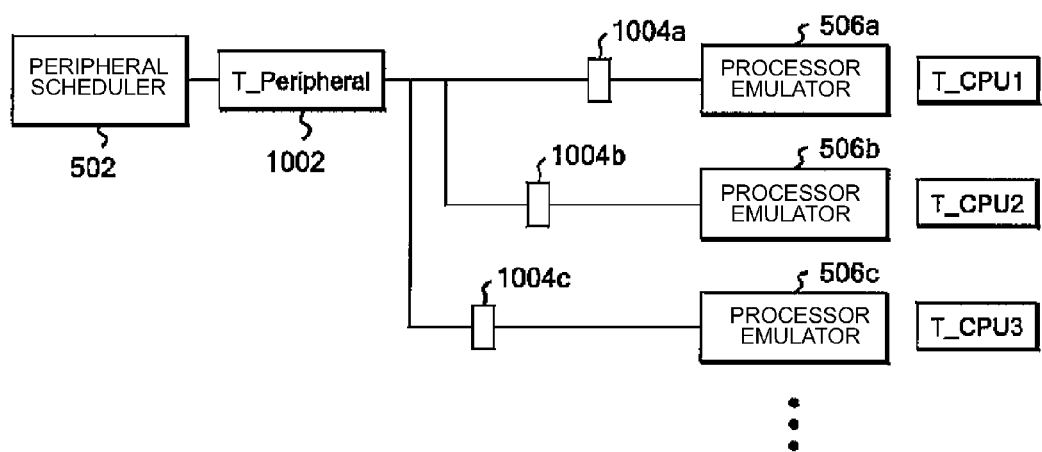
FIG. 10 is a diagram showing functions of completion flags for the processor emulators.

FIG. 10 is a diagram for explaining the aforementioned processing by using functional blocks. Specifically, the peripheral scheduler 502 sets a time of T_Peripheral 1002 based on timing of one of the peripheral emulators which reaches a processing break at the earliest. The processor emulators 506a, 506b, 506c, and . . . have specific times T_CPU1, T_CPU2, T_CPU3, and . . . , respectively, which are equivalent to the aforementioned T_CPU.

At the initialization stage, the peripheral scheduler 502 clears (sets to OFF) completion flags 1004a, 1004b, 1004c, and . . . of the processor emulators 506a, 506b, 506c, and . . . . At the time point when T_CPU>T_Peripheral holds true, the processor emulators 506a, 506b, 506c, and . . . each enter a wait state due to the aforementioned code.

To resume the operations of the processor emulators 506a, 506b, 506c, and . . . , the peripheral scheduler 502 provides new T_Peripheral 1002 satisfying T_CPU<T_Peripheral and clears (sets to OFF) the completion flags 1004a, 1004b, 1004c, and . . . of the processor emulators 506a, 506b, 506c, and . . . .

Next, by referring to FIG. 11, an operation of synchronization between the peripheral scheduler 502 and the plant simulators 508a, 508b, 508c, . . . , and 508n will be described by using functional blocks. A plant simulator is originally intended to perform update by making an approximate calculation of an internal state with a differential equation or the like by dividing a time into short steps. Thus, it can be said that the plant simulator has high suitability for proceeding processing up to a given time.

Figure 11:
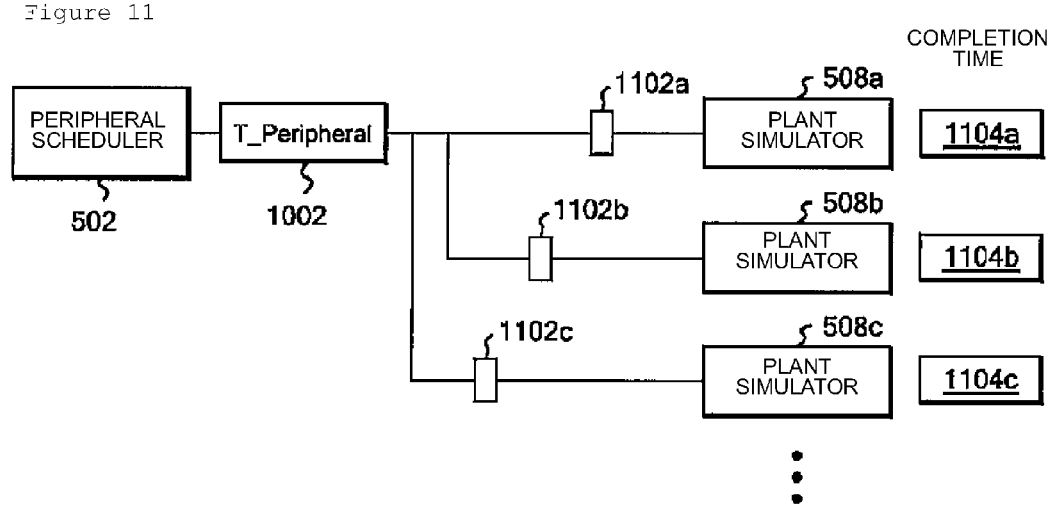
FIG. 11 is a diagram showing functions of completion flags for the plant simulators.

In FIG. 11, the peripheral scheduler 502 sets the time of T_Peripheral 1002 based on timing of one of the peripheral emulators which reaches a processing break at the earliest. The plant simulators 508a, 508b, 508c, and . . . have specific completion times 1104a, 1104b, 1104c, and . . . , respectively. At the initialization stage, the peripheral scheduler 502 clears (sets to OFF) completion flags 1102a, 1102b, 1102c, and . . . of the plant simulators 508a, 508b, 508c, and . . . . The completion flags 1102a, 1102b, 1102c, and . . . are preferably reserved in the shared memory.

Figure 12:
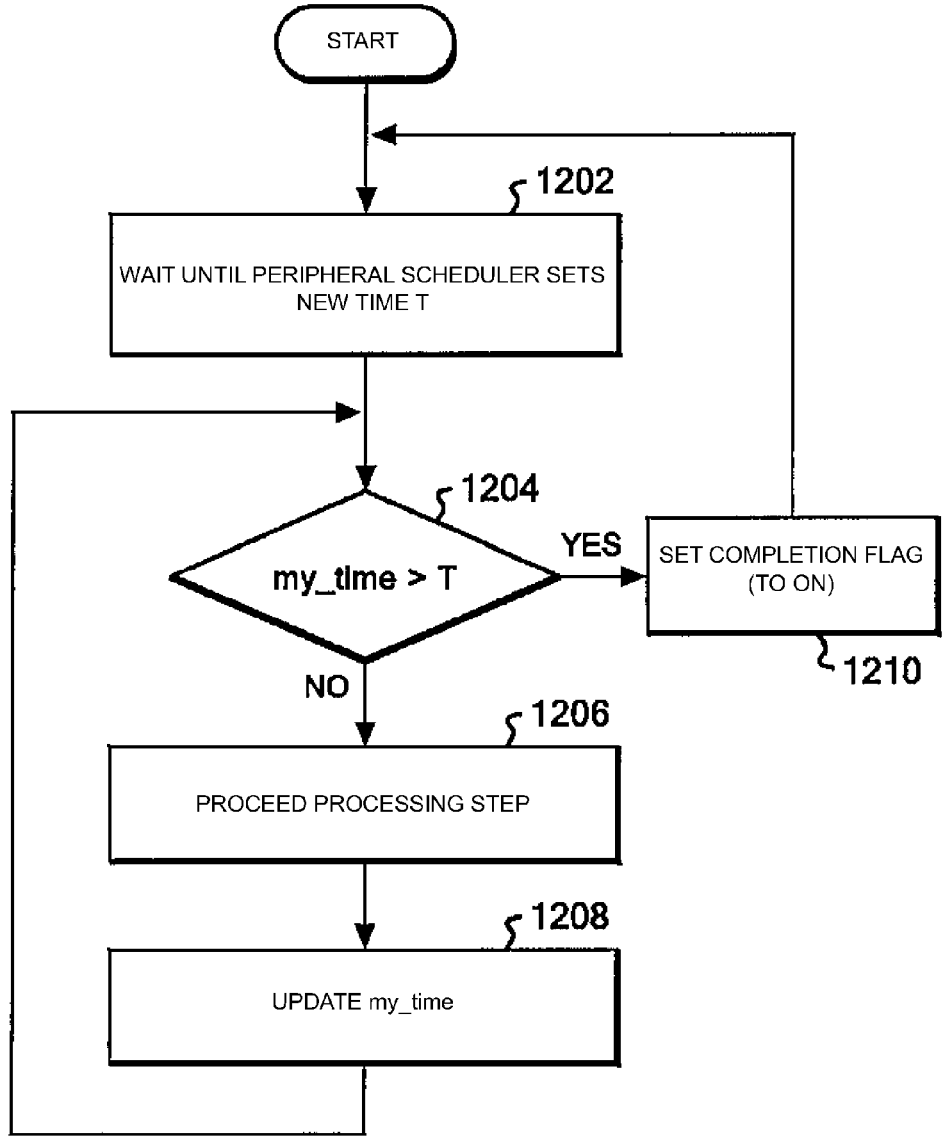
FIG. 12 is a flowchart of an operation of each plant simulator.

Next, synchronization processing for the plant simulators by the peripheral scheduler 502 will be described in detail by referring to a flowchart in FIG. 12. In FIG. 12, in Step 1202, each plant simulator waits until the peripheral scheduler sets a new time T. The time is T_Peripheral 1002 shown in FIG. 11.

In Step 1204, the plant simulator determines whether or not my_time>T. Note that my_time is the completion time 1104a, 1104b or the like for the plant simulator shown in FIG. 11.

If my_time>T does not hold true, the plant simulator proceeds to Step 1206 to proceed a given processing step. Then, the plant simulator increases my_time and returns to Step 1204.

If the plant simulator determines that my_time>T holds true in Step 1204, the plant simulator sets the completion flag to ON and returns to Step 1202.

Meanwhile, the completion flags of the plant simulator and the processor emulator can be implemented by using a mechanism called a counter semaphore in an embodiment.

In order to do this, code as follows is described on the peripheral scheduler 502 side.

```
extern sem_t sem_start[ ]; /* binary semaphores */
extern sem_t sem_finish; /* counter semaphore */
extern int n_plants; /* number of plant tasks */
extern int n_all; /* number of all tasks */
{
  ...
  /* Prepare for task execution */
  /* For example, update T_Peripheral or the like */
  ...
  /* Execute plant tasks in parallel */
```

-continued

```
        for (int k=0; k<n_plants; k++)
            sem_post(&sem_start[k]);
        ...
        /* Wait until all the tasks are completed */
        for (int k=0; k<n_all; k++)
            sem_wait(&sem_finish);
        ...
}
```

On the other hand, code as follows is described on the plant simulator side.

```
extern sem_t sem_start[ ]; /* binary semaphores */
extern sem_t sem_finish; /* counter semaphore */
{
        ...
        /* Wait for processing start instruction */
        sem_wait(&sem_start[k]);
        ...
        /* Proceed its own processing */
        ...
        /* Notify the peripheral scheduler of processing completion
*/
        sem_post(&sem_finish);
        ...
}
```

Note that n_plants is the number of plant simulators executed in the simulation system.
Code of
for (int k=0; k<n_plants; k++)
    sem_post (&sem_start[k]);
in the peripheral scheduler instructs each of tasks or threads the number of which is n_plants to start processing thereof. According to this code, each plant simulator executes
sem_wait (&sem_start[k]);
to receive the start instruction.

Meanwhile, sem_post (&sem_finish) on the processor emulator and plant simulator sides are suspended due to the following code in the peripheral scheduler.
for (int k=0; k<n; k++)
    sem_wait (&sem_finish);
That is, the peripheral scheduler waits for notification of processing completion of all the peripheral emulators and all the plant simulators. Note that a section describing POST Completion_flag in the code inserted into the code of the processor emulator is equivalent to sem_post (&sem_finish) in the processor emulator. The completion flags are shown in multiple in each of FIGS. 10 and 11. However, if the counter semaphore is used, a single completion flag may be used.

The specific embodiment of the present invention has heretofore been described with relation to the simulation systems for an automobile. However, those skilled in the art would understand that the present invention is not limited to such a specific embodiment and applicable to a simulation system for a general electronic and mechanical control system such as a simulation system for an airplane.

In addition, the present invention is not limited to architecture or a platform of a specific computer and implementable by any platform achievable multitasks.

EXPLANATION OF THE REFERENCE NUMERALS

404 processor
502 peripheral scheduler
504 peripheral emulator
506 processor emulator
508 plant simulator
702, 1004, 1102 completion flag

The invention claimed is:

1. A computer implemented simulation system that performs simulation, the simulation system comprising:
   a memory storage device;
   one or more processing devices in operative communication with said memory, the one or more devices configured to perform a method comprising:
      running a plurality of processor emulators on the computer;
      running a plurality of plant simulators on the computer;
      running a plurality of peripheral emulators on the computer, each of the peripheral emulators having a respective time information corresponding to specific processing break positions and configured to perform data communication with a corresponding processor emulator and a corresponding plant simulator;
      storing, in the memory storage device, a completion flag associated with each peripheral emulator of said plurality, each peripheral emulator configured to set its associated completion flag upon reaching a time of a processing break position; and
      running a peripheral scheduler process on the computer, the peripheral scheduler process configured to:
         re-set, at a start of a simulation, all completion flags to an off state;
         control running of all the processor emulators and all the plant simulators simultaneously and in parallel for said simulation;
         obtain time information corresponding to a break position of each said peripheral emulator,
         find one of the peripheral emulators which reaches the processing break position at the earliest and defining a processing break timing thereof;
         synchronize, responsive to a setting of the completion flag by a peripheral emulator, data communications between the plurality of processor emulators and the plurality of plant simulators at the found processing break timing, and
         re-set, upon completion of said synchronizing data communications between said plurality of processor emulators and the plurality of plant simulators, the completion flag provided for said peripheral emulator; and
         select as a next target processing break time, a peripheral emulator having a processing break timing closest to the time of a currently performed synchronization,
      whereby the simulation system operates according to scheduling based on such processing break timing of the peripheral emulators.

2. The simulation system according to claim 1, wherein the computer is a multitask system, and the plurality of processor emulators, the peripheral emulators, and the plurality of plant simulators are executed as individual threads or processes of the multiprocessor system.

3. The simulation system according to claim 2, wherein the computer is a multiprocessor system, and the plurality of processor emulators, the peripheral emulators, and the plurality of plant simulators are assigned to different processors or cores of the multiprocessor system to be executed as individual threads or processes.

4. The simulation system according to claim 2, wherein the synchronizing the plurality of processor emulators and the plurality of plant simulators comprises: setting further completion flags provided respectively for the plurality of processor emulators and the plurality of plant simulators that are stored in the memory of the computer.

5. The simulation system according to claim 4, wherein the further completion flags provided respectively for the plurality of processor emulators and the plurality of plant simulators are implemented by using a counter semaphore.

6. The simulation system according to claim 4, wherein said processor device further performs: storing in the memory, a table including peripheral-emulator-based processing break times, said peripheral scheduler process: selecting from the table, as a target processing break time, a processing break timing closest to the time of a currently performed synchronization.

7. The simulation system according to claim 1, wherein a number of predetermined processing break points is indicated in an emulator source code specific to a peripheral emulator, wherein said method further comprises:
scanning said source code to locate each of the specific processing breaks in the emulator source code.

8. A simulation computer implemented method for performing simulation, the simulation method comprising the steps of:
running a plurality of processor emulators on the computer;
running a plurality of plant simulators on the computer;
running a plurality of peripheral emulators on the computer, each of the peripheral emulators having time information corresponding to specific processing break positions and configured to perform data communication with a corresponding processor emulator and a corresponding plant simulator;
storing, in a memory storage device associated with the computer, a completion flag associated with each peripheral emulator of said plurality, each peripheral emulator configured to set its associated completion flag upon reaching a time of a processing break position; and
running a peripheral scheduler process on the computer, the peripheral scheduler process:
re-setting, at a start of a simulation, all completion flags to an off state;
controlling the running of all the processor emulators and all the plant simulators simultaneously and in parallel for said simulation;
obtaining time information corresponding to a break position of each said peripheral emulator,
finding one of the peripheral emulators which reaches the processing break position at the earliest and defining a processing break timing thereof; and
synchronizing, responsive to a setting of the completion flag by a peripheral emulator, data communications between the plurality of processor emulators and the plurality of plant simulators at the found processing break timing,
re-setting, upon completion of said synchronizing data communications between said plurality of processor emulators and the plurality of plant simulators, the completion flag provided for said peripheral emulator, and
selecting, as a next target processing break time, a peripheral emulator having a processing break timing closest to the time of a currently performed synchronization.

9. The simulation method according to claim 8, wherein the computer is a multitask system, and the plurality of processor emulators, the peripheral emulators, and the plurality of plant simulators are executed as individual threads or processes of the multiprocessor system.

10. The simulation method according to claim 9, wherein the computer is a multiprocessor system, and the plurality of processor emulators, the peripheral emulators, and the plurality of plant simulators are assigned to different processors or cores of the multiprocessor system to be executed as individual threads or processes.

11. The simulation method according to claim 9, wherein the synchronizing the plurality of processor emulators and the plurality of plant simulators comprises: setting further completion flags provided respectively for the plurality of processor emulators and the plurality of plant simulators that are stored in a memory of the computer.

12. The simulation method according to claim 11, wherein the further completion flags provided respectively for the plurality of processor emulators and the plurality of plant simulators are implemented by using a counter semaphore.

13. The simulation method according to claim 11, further comprising: storing in the memory, a table including peripheral-emulator-based processing break times, said peripheral scheduler process: selecting from the table, as a target processing break time, a processing break timing closest to the time of a currently performed synchronization.

14. A computer program product for performing a simulation, the program product comprising a computer readable medium, said medium not a propagating signal, said computer readable medium storing a simulation program of instructions that are readable by a processing device of a computer for causing the computer to execute the steps of:
running a plurality of processor emulators;
running a plurality of plant simulators;
running a plurality of peripheral emulators each of which has time information corresponding to specific processing break positions and performs data communication with a corresponding processor emulator and a corresponding plant simulator;
storing, in a memory storage device associated with the computer, a completion flag associated with each peripheral emulator of said plurality, each peripheral emulator configured to set its associated completion flag upon reaching a time of a processing break position; and
running a peripheral scheduler process on the computer, the peripheral scheduler process:
re-setting, at a start of a simulation, all completion flags to an off state;
controlling the running of all the processor emulators and all the plant simulators simultaneously and in parallel for said simulation;
obtaining time information corresponding to a break position of each said peripheral emulator, finding one of the peripheral emulators which reaches the processing break position at the earliest and defining a processing break timing thereof; and
synchronizing, responsive to a setting of the completion flag by a peripheral emulator, data communications between the plurality of processor emulators and the plurality of plant simulators at the found processing break timing,
re-setting, upon completion of said synchronizing data communications between said plurality of processor emulators and the plurality of plant simulators, the completion flag provided for said peripheral emulator, and selecting, as a next target processing break time, a peripheral emulator having a processing break timing closest to the time of a currently performed synchronization.

15. The computer program product according to claim 14, wherein the computer is a multitask system, and the plurality of processor emulators, the peripheral emulators, and the plurality of plant simulators are executed as individual threads or processes of the multiprocessor system.

16. The computer program product according to claim 15, wherein the computer is a multiprocessor system, and the plurality of processor emulators, the peripheral emulators, and the plurality of plant simulators are assigned to different processors or cores of the multiprocessor system to be executed as individual threads or processes.

17. The computer program product according to claim 15, wherein the synchronizing the plurality of processor emulators and the plurality of plant simulators comprises: setting further completion flags provided respectively for the plurality of processor emulators and the plurality of plant simulators that are stored in a memory of the computer.

18. The computer program product according to claim 17, wherein the further completion flags provided respectively for the plurality of processor emulators and the plurality of plant simulators are implemented by using a counter semaphore.

* * * * *